United States Patent

[11] 3,533,441

| [72] | Inventor | Edward J. Tischler<br>St. Paul, Minnesota |
|---|---|---|
| [21] | Appl. No. | 679,721 |
| [22] | Filed | Nov. 1, 1967 |
| [45] | Patented | Oct. 13, 1970 |
| [73] | Assignee | by mesne assignment to Union Tank Car Company<br>a corporation of Delaware. |

[54] CONTROL VALVE FOR WATER CONDITIONING SYSTEM
6 Claims, 7 Drawing Figs.

[52] U.S. Cl. ................................................. 137/599.1,
137/599.2, 210/191
[51] Int. Cl. ..................................................... B01d 29/38
[50] Field of Search .......................................... 137/599.1,
599.2; 210/190, 191

[56] References Cited
UNITED STATES PATENTS

| 3,080,975 | 3/1963 | Rose............................ | 210/191X |
| 3,083,728 | 4/1963 | Schulze et al................. | 137/599.1 |
| 3,187,771 | 6/1965 | Rudelick....................... | 137/599.1 |
| 3,354,907 | 11/1967 | Kryzer et al.................. | 137/599.1 |

Primary Examiner—Robert G. Nilson
Attorney—Hume, Clement, Hume and Lee

ABSTRACT: A valve arrangement for controlling a variable cycle water conditioning operation. Main inlet and outlet valves provide three-position, three-way control and three-position, four-way flow control, respectively, with positive prevention of brine leakage and more efficient cycle transition among the advantages.

Patented Oct. 13, 1970
3,533,441
Sheet 1 of 4
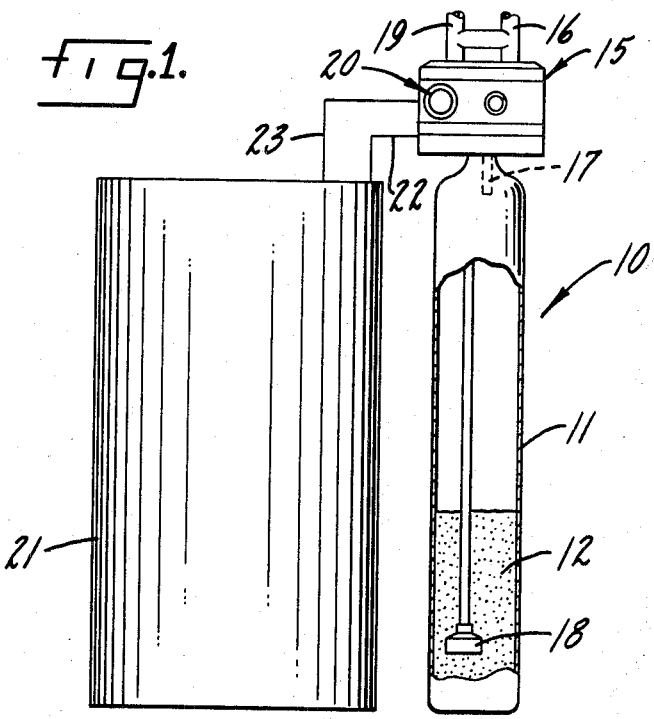
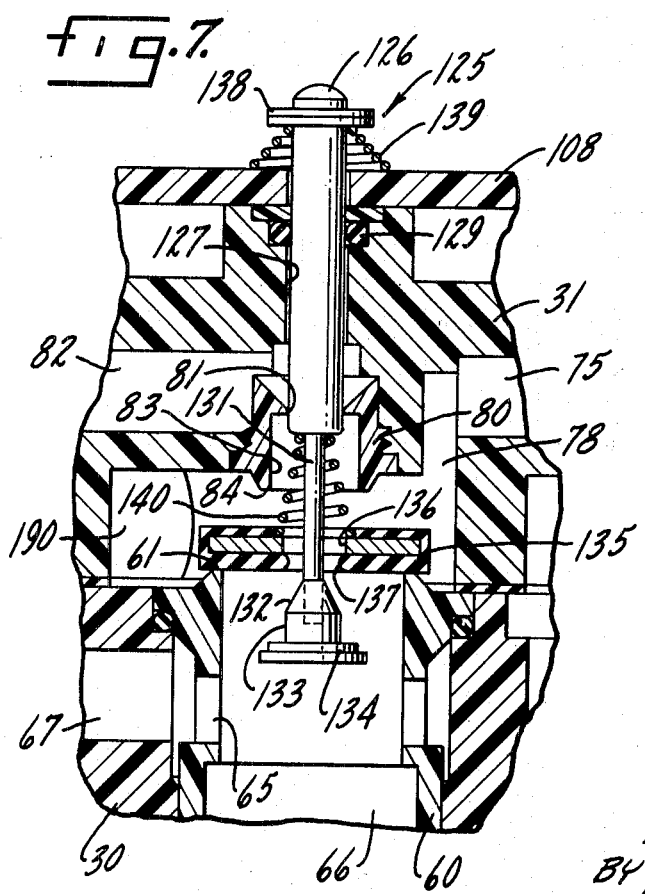
INVENTOR.
Edward J. Tischler,
BY Hume, Clement, Hume & Lee
Attorneys.

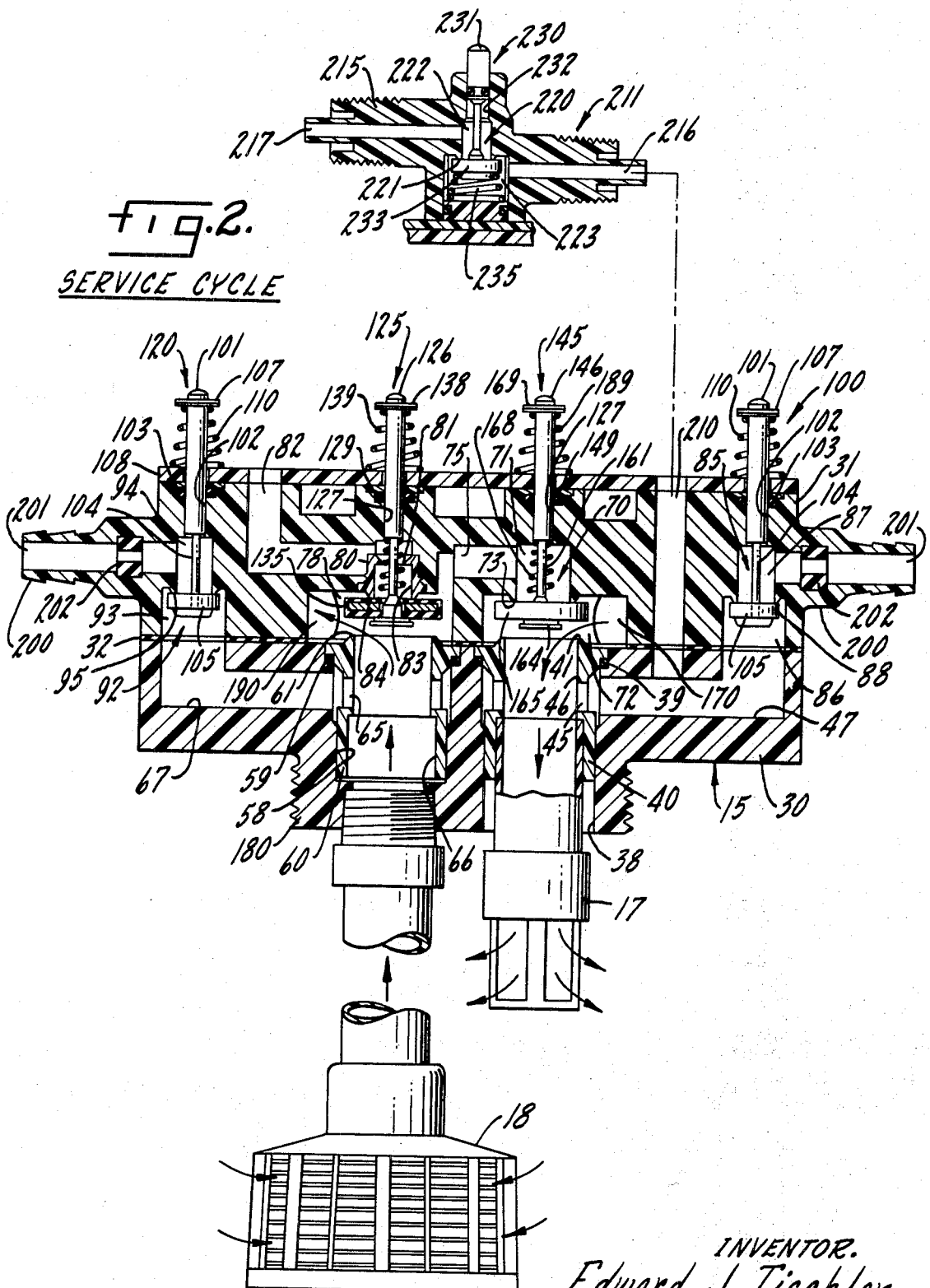

PRE-BRINING BACKWASH CYCLE

BRINING AND SLOW RINSE CYCLE

INVENTOR.
Edward J. Tischler,
BY Hume, Clement, Hume & Lee
Attorneys.

POST-BRINING BACKWASH CYCLE

FAST-RINSE CYCLE

INVENTOR.
Edward J. Tischler,
BY Hume, Clement, Hume & Lee
Attorneys.

CONTROL VALVE FOR WATER CONDITIONING SYSTEM

This invention relates in general to water conditioning. It deals more particularly with the control of water conditioning operations, including normal service and conditioning medium regeneration.

Water conditioning of a generally conventional nature comprises treatment of the water during normal service and then regeneration of the treatment medium during a regeneration period. Normal service treatment includes the passage of hard water, for example, through a tank containing a resin capable of removing hardness inducing ions from the water. As the water flows through the resin bed, the resin removes these ions, creating soft water which flows out of the tank to service lines.

Depending upon the specific characteristics of the hard water being treated, it might also be passed through a clarifier to remove silt, clay, etc., a neutralizer to counteract acidity, and an oxidizing filter to remove ferric iron from the water, for example, all before the resin treatment to soften the water. After the softening, the water is sometimes filtered for taste and odor.

The basic treatment is, however, the softening treatment effected by resin in the treatment tank and referred to as "water softening". At preset time intervals during this water softening process, the bed of resin in the treatment tank requires regeneration to remove the hardness inducing ions attached to the resin and restore the resin's ability to remove these ions from hard water at a satisfactory rate.

This is ordinarily accomplished by passing a brine solution through the bed of resin in the treatment tank. Sodium ions from the brine exchange places with calcium and magnesium ions and the like attached to the resin and the calcium and magnesium ions are carried out to drain with the treatment brine.

In addition to the brining cycle in a regeneration process, it is conventional to additionally treat the bed of resin in one or more of a number of additional cycles. These include passing hard water in a reverse direction through the bed of resin before the brining cycle to loosen the bed and remove accumulated foreign material, for example. This cycle is referred to as pre-brining backwash.

Another cycle employed is the slow passage of hard water through the bed of resin in the direction of normal service water flow at a relatively slow rate after brining to rinse residual brine and foreign material out of the resin bed. This is referred to as the slow rinse cycle.

Still another cycle frequently employed is the backwash of water through the bed of ion exchange resin after brining and slow rinse to further assist in removing residual brine and foreign material. This cycle is referred to as the post-rinse backwash.

Finally, it is conventional to employ a relatively fast flow of hard water through the ion exchange resin bed in the direction of normal service water flow after brining to remove the last vestiges of residual brine and foreign material. This cycle is referred to as the fast rinse cycle.

Various combinations of the aforedescribed cycles are employed in the regeneration process of different water conditioning systems. Each necessarily includes the brining cycle, of course. In other respects, they might differ considerably. Substantially different control valves are ordinarily employed to control systems employing a varying number and sequences of service and regeneration cycles.

The Kryzer U.S. Pat. No. 3,215,273, for example, discloses a control valve arrangement for a water conditioning system in which a four-cycle treatment is employed. These cycles include normal service conditioning of the water, the brining cycle, the slow rinse cycle and a post-brining backwash cycle. In contrast, in the Rose U.S. Pat. No. 3,080,975, a markedly different valve arrangement controls a five-cycle conditioning system including a normal service cycle, pre-brining backwash, brining, slow rinse, and fast rinse. Other distinctively constructed valve arrangements provide six-cycle systems wherein the cycles include normal service conditioning, pre-brining backwash, brining, slow rinse, post-brining backwash, and the fast rinse cycle.

It is an object of the present invention to provide a single valve arrangement which operates in any capacity to control a three-cycle, four-cycle, five-cycle, or six-cycle, or more, water conditioning system, without any modification of the valve arrangement itself. Merely a variation in the manner in which the individual valves in the valve arrangement are manipulated is sufficient to entirely change the number and sequence of individual cycles in the conditioning process. As a result, a water conditioning system manufacturer can provide customers with a wide range of treatment capabilities while producing and stockpiling a minimum number of valve components at a great savings in cost.

In the multiple cycle valve arrangement of the invention, the construction of the two main valves embody features of the invention. One of the main valves is a three-position, four-way valve. The other main valve is a three-position, three-way valve. Each performs multiple functions in the system. The multiple action of each main valve, for example, is effective to provide positive prevention of brine leakage into the service line after regeneration in the four, five or six-cycle systems. Both main valve constructions assure more efficient cycle transition, as well as providing other advantages.

The invention, both as to its organization and method of operation, taken with further objects and advantages thereof, will best be understood by reference to the following description taken in connection with the accompanying drawings, in which:

FIG. 1 is a diagrammatic front elevational view of a water conditioning system including a control valve arrangement embodying features of the present invention, with parts broken away;

FIG. 2 is a diagrammatic sectional view through the valve arrangement embodying features of the invention, with the valve arrangement in its "service" setting;

Figure 3:
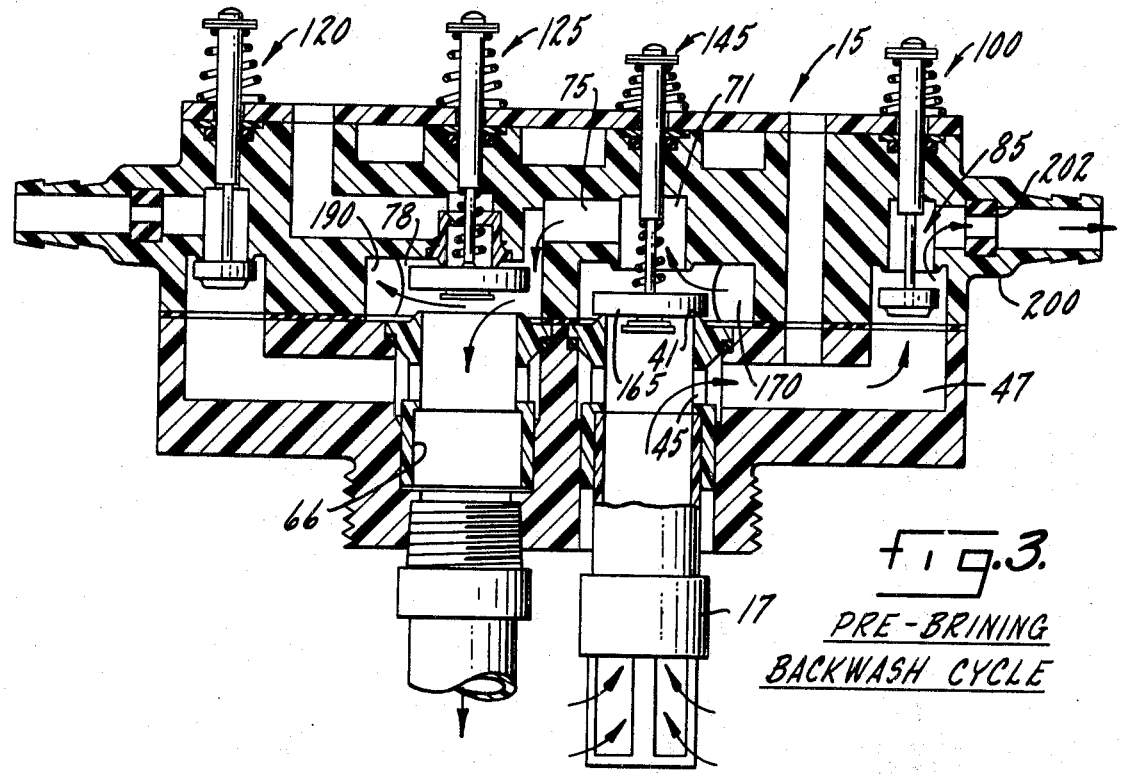
FIG. 3 is a view similar to FIG. 2 illustrating the valve arrangement in its pre-brining backwash setting.

Referring now to the drawings, and particularly to FIG. 1, a water conditioning system of broadly conventional construction is illustrated generally at 10. The system 10 includes a water treatment tank 11 containing a bed 12 of particulate material through which water to be treated is passed. The particulate material is a suitable resin, of the type widely used in water softeners of the like, which has the capacity for removing hardness inducing ions such as calcium and magnesium from the water passed through it.

In normal service water operation of the water conditioning system 10, a control valve arrangement 15 embodying features of the present invention directs service water from a service inlet line 16 into the tank 11 through a top baffle 17, through the particulate material, and out of the tank through a bottom distributor 18 to the service outlet line 19. Flow of service water in the aforedescribed pattern continues for a prescribed length of time, established and controlled by a timing device 20 (enclosed in the same housing as the valve arrangement 15).

At a selected time or a selected day, the valve arrangement 15 initiates and controls regeneration of the resin bed 12. Depending upon the configuration of conventional cams (not shown) driven by the timing device 20, four, five, or six-cycle regeneration takes place. The valve arrangement 15 is not modified in any way to vary the cyclical treatment. It is only necessary to make simple changes in the configuration of the generally conventional cams.

Regardless of the number or sequence of cycles selected, a brining cycle is required. Accordingly, the valve arrangement 15 is connected to a conventional nozzle (not shown) in a brine tank 21 by a line 22. The nozzle, in turn, contains a conventional brine draw venturi which is connected by a line 23 to the valve arrangement 15. Brining is effected in a manner hereinafter discussed in detail.

Referring now to FIG. 2, the valve arrangement 15 is illustrated in partially diagrammatic section. The valve arrangement 15 includes a separate valve base 30 and valve head 31 clamped together by bolts (not shown) at an interface 32 about a sealing gasket between the base and the head to form a valve body. Both the base 30 and head 31 are molded of a suitable plastic material.

The valve base 30 has a vertically disposed passage 38 extending through it. Seated on an O-ring seal 39 in the passage 38 is a generally cylindrical plastic inlet sleeve 40. The inlet sleeve 40 is seated in the passage 38 from its upper end and retained therein by the head 31. An annular valve seat 41 defines the upper periphery of the sleeve 40.

The inlet sleeve 40 has a series of radially disposed apertures 45 extending through it, placing the bore 46 through the sleeve in communication with a horizontally extending passage 47 in the valve base 30. The passage 47 extends to and through the interface between the valve base 30 and the head 31.

Extending parallel to the passage 38 through the base 30 of the valve arrangement 15 is a companion passage 58. Mounted in the passage 58 on a sealing O-ring 59 is a generally cylindrical outlet sleeve 60. The outlet sleeve 60 is retained in the passage 58 by the overlying head 31. An annular valve seat 61 defines the upper periphery of the sleeve.

A plurality of apertures 65 extend radially through the outlet sleeve 60. The radially disposed apertures 65 place the bore 66 through the sleeve 60 in communication with a horizontally disposed passage 67 in the valve base 30. The passage 67 extends to and through the interface 32 between the base 30 and head 31.

Referring specifically to the valve head 31, it includes a stepped, generally cylindrical chamber 70 in registry with the passage 38 and inlet sleeve 40 in the valve base 30. The smaller upper chamber section 71 and larger lower inlet chamber 72 are separated by an annular valve seat 73.

The vertically extending upper chamber section 71 is connected by horizontal passage 75 to a generally cylindrical outlet chamber 78. The outlet chamber 78 is in registry with the vertically extending passage 58 and the outlet sleeve 60 in the base 30 of the valve arrangement 15.

A generally cylindrical plastic fitting 80 is threaded into the roof of the chamber 78 and places the chamber 78 in communication with a passage 82 in the valve head 31 through its bore 83. An annular lower valve seat 84 is formed around the lower periphery of the fitting 80, and an annular inner valve seat 86 is formed in the upper inside of the bore 83 through the fitting.

Immediately over and in communication with the passage 47 in the valve base 30 at the interface 32, a stepped cylindrical chamber 85 is formed in the valve head 31. The chamber 85 is divided into a lower section 86 and an upper section 87 by an annular valve seat 88.

Immediately over and in communication with the passage 67 in the valve base 30, at the interface 32, a stepped chamber 92 identical to the stepped chamber 85 hereinbefore discussed is formed in the head 31. The chamber 92 includes a lower section 93 and an upper section 94 separated by an annular valve seat 95.

Referring now to the valves defined in each of the chambers 85, 92, 78 and 70, a valve assembly 100 extends through the valve head 31 into the stepped chamber 85. The valve assembly 100 includes a valve pin 101 slidable in a bore 102 extending vertically out of the valve head 31 through an O-ring seal 103. A reduced diameter section 104 is formed on the lower end of the pin 101 and an annular, resilient valve disk 105 is mounted on the lower end of the pin section 104 by suitable means.

The upper end of the valve pin 101, which extends above the head 31, mounts a snap ring 107. Disposed between the snap ring 107 and a mounting plate 108 overlying the valve head 31 is a conventional coil spring 110. The coil spring 110 biases the valve disk 105 toward an "up" position wherein it is seated on the valve seat 88, sealing off communication between chamber sections 86 and 87.

A valve assembly 120 identical to the valve assembly 100 described immediately above extends into the corresponding stepped chamber 92 in the valve head 31. The construction and operation of the valve assembly 120 is identical to that of the valve assembly 100, and accordingly, a detailed description is considered unnecessary. Corresponding components of the valve assemblies 100 and 120 are identified by corresponding reference numerals.

Referring now to FIG. 7 in addition to FIG. 2, a valve assembly 125 extends through the valve head 31 into the outlet chamber 78. The valve assembly 125 includes a valve pin 126 slidable in a bore 127 and extending vertically out of the head 31 through an O-ring seal 129.

The valve pin 126 has a reduced diameter section 131 intermediate its ends but closer to its lower end. A separate, lower section comprising an outwardly tapered portion 132, a short, normal diameter portion 133, and an enlarged foot 134, is threaded onto the reduced diameter section 131 of the pin.

Mounted on the pin 126 in relatively movable relationship in the chamber 78, is a valve disk 135. The valve disk 135 comprises a metal washer covered with resilient material and has a central aperture 136 through the disk. The resilient material actually forms a lower lip 137 in the aperture 136. The diameter of the aperture 126 at the lip 137 is slightly smaller than the lower pin section 133 so that the aperture 136 is sealed when the pin 126 is raised so that the disk 135 seats on the foot 134. A coil spring 138 biases the disk 135 toward its seat on the foot 134.

The valve assembly 125 is movable between an "up" position wherein the valve disk 135 seats and seals against the valve seat 84 and the aperture 136 is sealed, an "intermediate" position wherein the valve disk seats and seals against the valve seat 61 and the aperture 136 is still sealed, and a "down" position wherein the valve disk is seated on the seat 61 and the pin section 133 has moved out of the aperture 136 to open it. The upper end of the pin 126, which extends above the head 31, mounts a upper snap ring 139. Disposed between the snap ring 139 and the plate 108 is a coil spring 140 which biases the valve assembly 125 toward its "up" position.

With the pin 126 in the "up" and "intermediate" positions of the valve assembly 125, the reduced diameter section 131 of the pin is disposed in the bore 83 of the fitting 80 at the valve seat 81 so the bore is open. With the pin 126 in a "down" position, the normal diameter of the pin effectively seals off the bore 83 at the seat 81. The valve assembly thus functions in its fourth way to control liquid passage through the bore 83.

The valve assembly 125 thus operates as a three-position, four-way valve. The actual operation of the valve assembly 125 to control water treatment will hereinafter be discussed in greater detail in relation to the operation of the valve arrangement 15.

Extending through the valve head 31 into the chamber 70 is a valve assembly 145 substantially identical to the valve assembly 125. As such, the valve assembly 145 includes a valve pin 146 slidable in a bore and extending out of the valve head 31 through an O-ring seal.

The pin 146 has a reduced diameter section 161 intermediate its ends but closer to its lower end. The reduced diameter section 161 tapers outwardly to a short lower portion 17 and out the radial apertures 45 in the sleeve 40 into the horizontal passage 47. The passage 47 carries the backwash water into the chamber 85 where it passes the unseated valve assembly 100 and is directed to drain through the fitting 200 and the flow restrictor 202. The flow restrictor 202 prevents backwash water flow from reaching a flow rate wherein resin particles are carried up into the valve arrangement 15.

Figure 4:
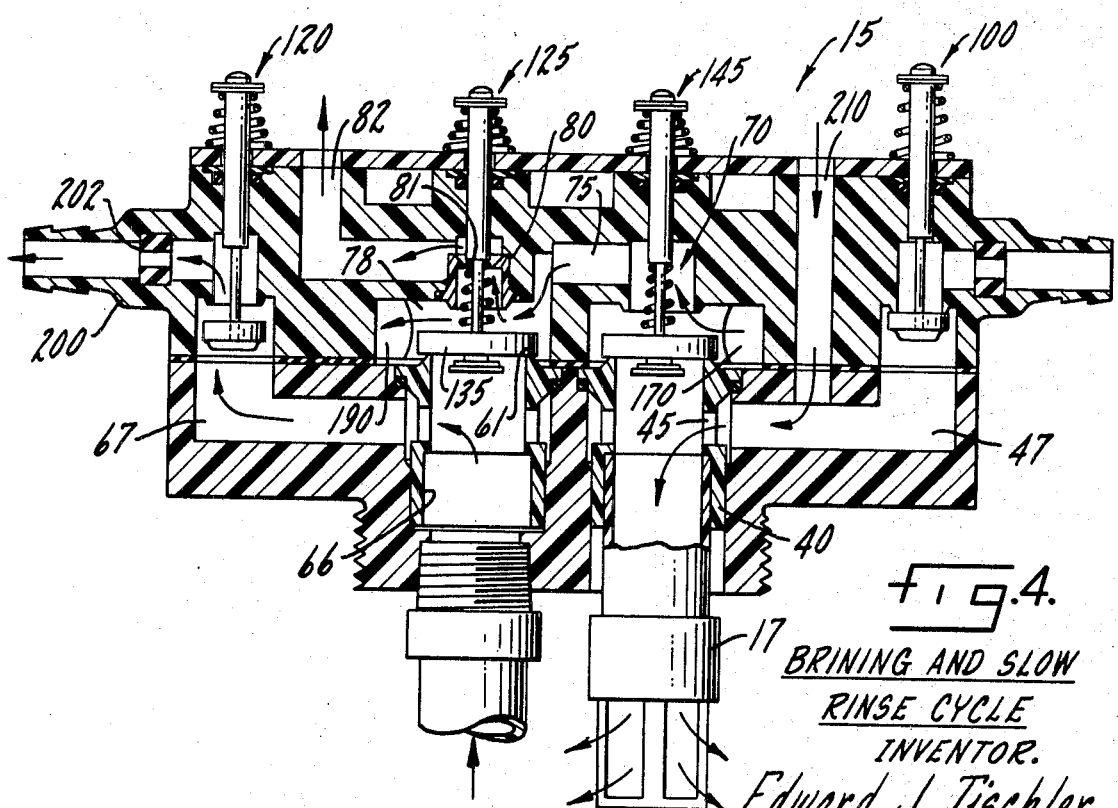
FIG. 4 is a view similar to FIG. 2 illustrating the valve arrangement in its brining and slow rinse settings.

Referring now to FIG. 4, after a backwash cycle of preset length, the aforementioned cam arrangement further manipulates the two drain valve assemblies 100 and 120, the inlet valve assembly 125, and the brine shutoff valve assembly 230 to initiate the brining cycle. The drain valve assembly 100 is permitted to move to its "up" position. The drain valve assembly 120 is moved to its "down" position, the inlet valve 125 is moved to its "intermediate" position wherein the valve disk 135 seats on and seals the annular valve seat 61, and the lower pin section 133 still seals the aperture 136 through the disk. The brine shutoff valve assembly 230 is moved to its "down" position.

The inlet valve assembly 145 is still in its "intermediate" position. Accordingly, water entering the chamber 72 from the inlet port 170 is still directed through the passage 75 into the outlet chamber 78. With the valve disk 135 seated on the valve seat 61 and the aperture 136 through the disk closed, a portion of the water departs the chamber 78 through the outlet port 190 to the service line 19. Another portion of the incoming water passes upwardly through the fitting 80, past the annular valve seat 81 into the passage 82, and from thence to the nozzle (not shown) in the brine tank 21 through the line 22.

Brine is drawn from the brine tank 21 in a conventional manner through the venturi arrangement and returned through the line 23 to the brine shutoff valve housing 211. With the brine shutoff valve assembly 230 in its "down" position, brine passes through the passage 210 into the passage 47 and then through the sleeve aperture 45 and down out of the sleeve 40 and distributor 17 into the treatment tank 11. The brine descends through the bed 12 of resin, removing hardness inducing ions therefrom. The brine passes into the collector 18 and up to the valve arrangement 15. This brine departs the valve arrangement 15 through the passage 67, past the drain valve assembly 120, and out the drain valve fitting 200 through the flow restrictor 202.

Brining in the aforementioned manner continues until all of the brine from a reservoir in the brine tank 21 is withdrawn. The timing of the cam arrangement is such however, that after brining is completed, the valve positions remain unchanged for a prescribed length of time. Fresh water thus continues to flow in the aforedescribed path without drawing brine with it from the brine tank 21. This fresh water in passing through the bed 12 of resin accomplishes a "slow rinse" of the resin bed, serving to begin removal of residual brine and foreign material from the bed. The brining and slow rinse cycle might continue for approximately 50 minutes, of which the last eight minutes is taken up by the slow rinse function.

Figure 5:
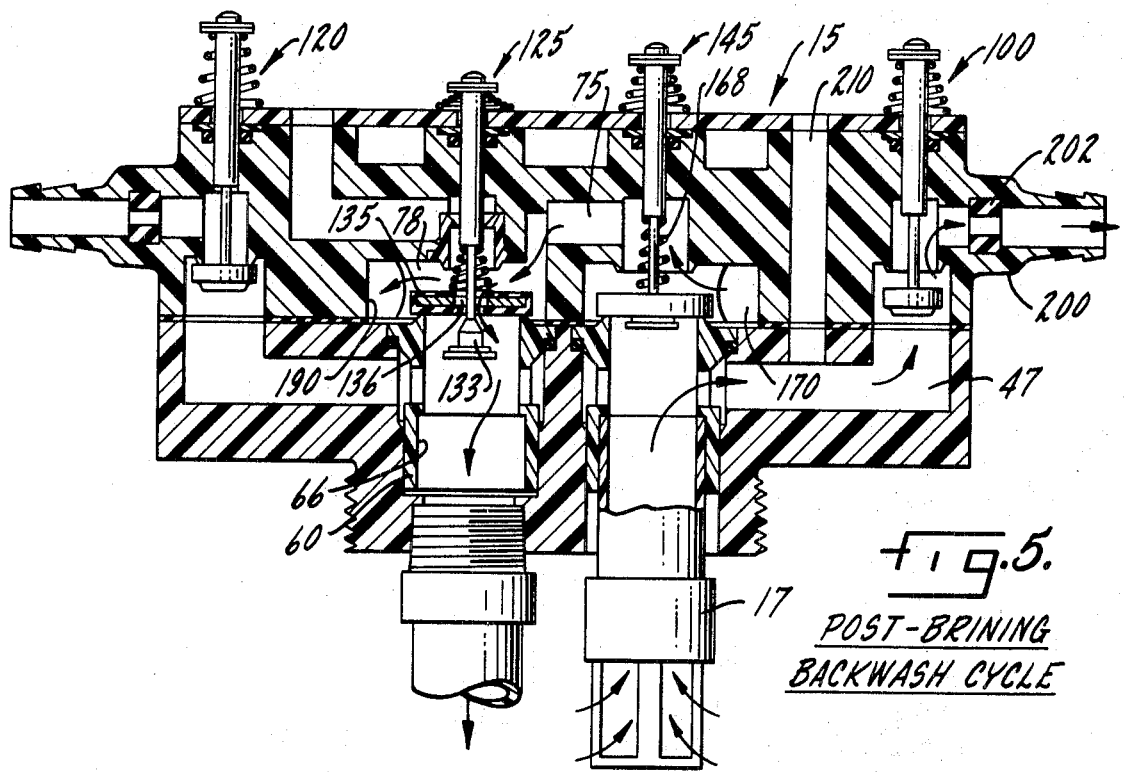
FIG. 5 is a view similar to FIG. 2 illustrating the valve arrangement in its post-brining backwash setting.

Referring now to FIG. 5, manipulation of the cam arrangement by the timing device 20 is then effective to terminate the slow rinse cycle and initiate post-brining backwash of the system 10. The cam arrangement moves the drain valve assembly 100 to its "down" position, the drain valve assembly 120 is permitted to move to its "up" position, and the brine shutoff assembly 230 is permitted to move to its "up" position.

At the same time, the outlet valve assembly 125 is moved to its "down" position, wherein the aperture 136 through the valve disk 135 is opened as the valve pin section 133 moves out of the aperture. Water from the inlet port 170 continues to be directed through the passage 75 to the outlet chamber 78. A portion of the water passes out of the outlet port 190 to the service line 19. Another portion of the incoming water passes through the open aperture 136 in the valve disk 135 into the bore 66 of the sleeve 60. This water flows downwardly out of the collector 18 and into the bottom of the bed 12 of resin. The upflow of water through the resin removes additional residual brine and foreign material, if any, from the bed, and passes into the valve arrangement 15 through the distributor 17. This liquid passes through the passage 47 and past the valve assembly 100 out of the drain fitting 200 through the restrictor 202 to drain.

After post-brining backwash has continued for a preset period of time in the aforedescribed manner, the cam arrangement permits the brine shutoff valve assembly 230 to open. At this time, some of the now relatively clean backwash water (which is soft water) passes through the passage 210 to the valve housing 211 and through the line 23 into the brine tank to refill the brine tank reservoir with fresh water. Brine tank refill continues for the reminder of the backwash period.

Figure 6:
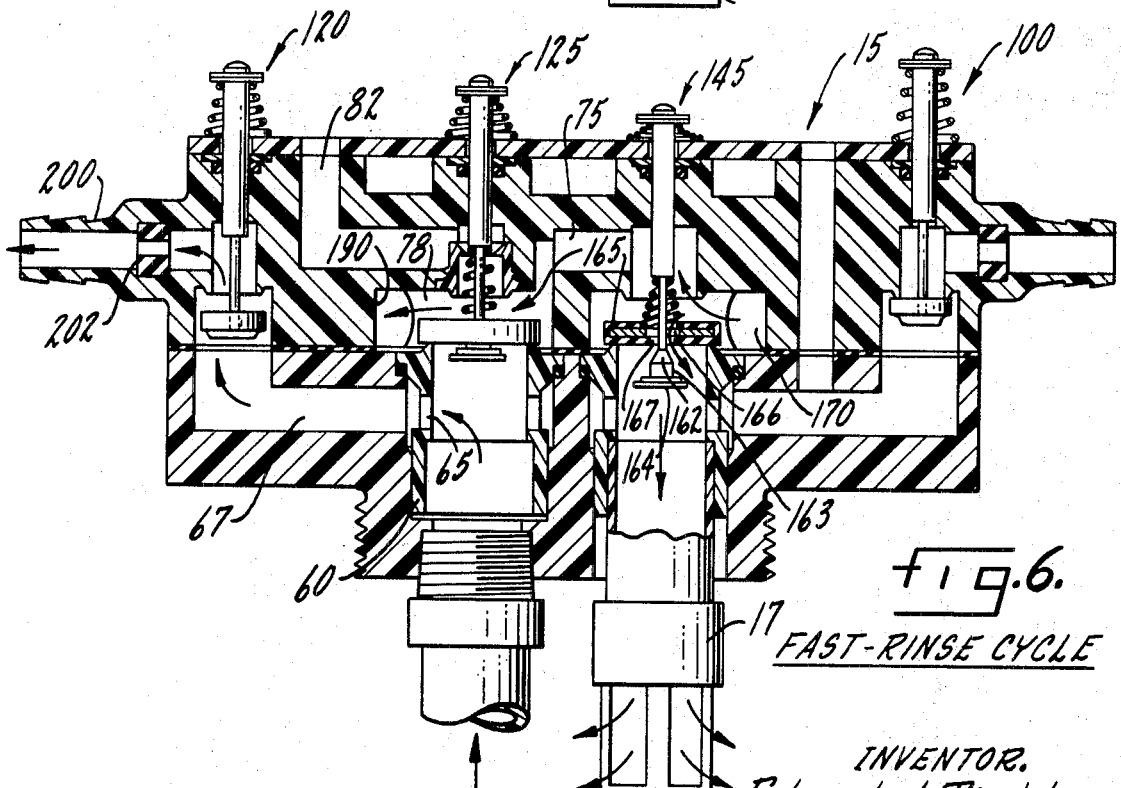
FIG. 6 is a view similar to FIG. 2 illustrating the valve arrangement in its fast rinse setting; and, FIG. 7 is an enlarged diagrammatic view of the three-position, four-way main valve in the valve arrangement of the invention.

Referring now to FIG. 6, after the backwash and brine tank refill periods of prescribed length, the cam arrangement further manipulates the valve arrangement 15 to terminate post-brining backwash and begin the fast rinse cycle or regeneration. As such, the cam arrangement permits the brine shutoff assembly 230 to move to its "up" position. The drain valve 100 is permitted to move to its "up" position. The drain valve assembly 120 is moved to its "down" position. The inlet valve assembly 145 is moved to its "down" position, wherein the aperture 166 through the valve disk 165 is opened. The outlet valve assembly 125 is permitted to move back to its intermediate position wherein the aperture 136 through the valve disk 135 is closed.

In the fast rinse cycle, water flowing in through the inlet port 170 divides into two flow portions. A portion of this inlet water flows through the passage 75 into the outlet chamber 78 and out of the outlet port 190 to the service line 19. Another portion of this inlet water passes through the aperture 166 in the valve disk 165 and down through the distributor pipe 175 into the treatment tank 11. This flow of rinse water passes through the bed 12 of ion exchange resin and is returned to the valve arrangement 15 through the collector pipe 18. The rinse water passes upwardly into the sleeve 60 and out through its radial apertures 65 and the passage 67 to the drain valve assembly 120. The drain valve assembly 120 is open so the rinse water flows through the restrictor 202 in the fitting 200 to drain.

After a fast rinse cycle of preselected length, the cam arrangement (not shown) is once again effective to return the valve arrangement 15 to the valve relationship shown in FIG. 2. Service softening of the water is once again initiated.

The construction of the multiple cycle valve arrangement 15 embodying features of the present invention has now been described in detail, together with operation and control of a six-cycle water conditioning system 10. In order to change the system 10 over to a control five cycle water conditioning system, for example, it is merely necessary to modify the aforementioned cam arrangement (not shown) so that the sequence of operation of the valve arrangement 15 is varied in a prescribed manner.

To set the valve arrangement 15 up for a conventional five-cycle operation, the post-brining backwash cycle is eliminated. The makeup of the aforementioned conventional cam arrangement is altered so that the valve assemblies 100, 120, 125, 145 and 230 move (or remain stationary) from their positions shown in FIG. 4 (the brining and slow rinse cycles) to the positions shown in FIG. 6 (the fast rinse cycle). In the case of the five-cycle system, where post-brining backwash is eliminated, soft water refill of the brine tank 21 is effected through the nozzle passage 82 and the line 22 during the fast rinse cycle.

Where a four water conditioning system is desired, the six-cycle system 10 is modified by eliminating the pre-brining backwash and fast rinse cycles. As such, the aforementioned cam arrangement is made up so that the valve assemblies 100, 120, 125, 145 and 230 are moved (or remain stationary) directly from the service position shown in FIG. 2 to the brining and slow rinse position shown in FIG. 4. Subsequent to the post-brining backwash cycle seen in FIG. 5, the cam arrangement moves the valve assemblies directly to their service positions, as illustrated in FIG. 2.

of the core (see FIG. 6) which is of normal diameter. This short lower portion mounts a foot 164 on its lower end. The pin 146 is identical to the pin 126 insofar as construction of its separate lower section including the taper 162, lower portion 163 and foot 164 are concerned.

A disk 165 identical to the disk 135 hereinbefore discussed is movably mounted on the pin 146. The disk 165 has an aperture 166 (see FIG. 6) at its center through which the pin 146 extends and an annular lip 167 around the aperture is adapted to seal against the lower pin section. A coil spring 168 biases the disk 165 toward its seat on the foot 164.

The valve assembly 145 is also movable between "up", "intermediate", and "down" positions. As such, the valve disk 165 seats and seals against the valve seat 73, against the valve seat 41, and the aperture 166 through the disk is closed or opened. A snap ring 169 retained coil spring 169a biases the valve assembly toward its "up" position. The operation of the valve assembly 145 is hereinafter discussed in detail in relation to the operation of the valve arrangement 15.

The inlet chamber 72 is in communication, through a diagrammatically illustrated inlet port 170, with the service inlet line 16. The port 170 is actually formed in the valve base and is in communication with the chamber 72 at the interface 132 between the valve base 30 and the valve head 31, but is shown in the back of the chamber 72 in the valve head for ease of illustration.

Seated in the lower end of the sleeve 40 below the inlet chamber 72 is the conventional baffle pipe 17. The baffle pipe 17 extends into the treatment tank 11. In this light, it will be seen that the valve base 30 has a threaded neck 180 through which the valve arrangement 15 is seated in the top of the tank 11.

The conventional bottom distributor pipe 18 is threaded into the lower end of the passage 58 communicating with the outlet chamber 78. The bottom distributor pipe 18 extends downwardly within the tank 11 into the resin bed 12 in a well-known manner.

Also in communication with the outlet chamber 78 in the valve head 31 is an outlet port 190. The outlet port 190 is connected to the service outlet line 19. Similar to the inlet port 170, the port 190 is shown in the back of the outlet chamber 78 for purposes of illustration, but in actual practice it is formed behind the chamber 78 in the valve base 30.

The chambers 85 and 92 in the valve head 31 are each connected to suitable drain lines (not shown) through corresponding drain fittings 200. Passages 201 extend through the fittings 200 and contain flow restrictor washers 202.

The horizontal passage 47 in the valve base 30 is also connected through a passage 210 and suitable conduit means (not shown) to an independent valve housing 211 of the valve arrangement 15. The passage 210 is shown extending through the valve head 31 for ease of illustration and description although it actually is in the valve head 31.

The housing 211 is mounted on the plate 108 surmounting the valve head 31 and comprises a moulded plastic body 215 having a horizontally displaced pair of oppositely disposed passages 216 and 217 extending therefrom. The passages 216 and 217 are connected in the center of the valve body 215 by a stepped chamber 220. An annular valve seat 221 separates the chamber 220 into an upper chamber section 222 and a lower chamber section 223.

Extending into the chamber 220 is a valve assembly 230. The valve assembly 230 includes a valve pin 231 slideable in a valve bore and mounting a valve disk 233 at its lower end. The valve disk 233 is adapted to seat against the annular valve seat 221 when in its "up" position and is biased in that direction by a coil spring 235 seated in the base of the lower chamber section 223.

The remaining passage 82 in the valve arrangement 15 connects the outlet chamber 78 with the conventional nozzle line 22. In practice, the passage 82 extends downwardly from the valve head 31 into the valve base 30 and thence through a suitable fitting (not shown) to the line 22. For ease of illustration, however, it is depicted extending directly out of the valve head 31.

The construction of the valve arrangement 15 has now been described in detail. Operation of the valve arrangement 15 is best described by reference to FIGS. 3—6 as well as to FIG. 2. It is first described in the context of a six-cycle water conditioning system.

The valve arrangement 15 has been described with specific reference to FIGS. 2 and 7. In FIG. 2, the valve arrangement 15 is illustrated in the valve setting designed to effect normal service water conditioning. This is the service cycle which is in effect most of the time; usually at least 23 out of 24 hours in a day, for example.

During the service cycle of the water conditioning system 10, the aforementioned conventional cam arrangement (not shown) is in its neutral position. As such, each of the drain valve assemblies 100 and 120, the main flow control valve assemblies 125 and 145 and the brine shutoff valve assembly 230, are biased into their "up" positions. Insofar as the brine valve assemblies 100, 120, and the brine shutoff valve assembly 230 are concerned, this means that they are biased into seated and sealing relationship on their respective valve seats and fluid communication through corresponding passages is shut off.

In the "up" position of the inlet valve assembly 145, the valve disk 165 is biased against the valve seat 73 in the inlet chamber 72. At the same time, the pin 146, at its lower section 163, seals the aperture 166 through the disk 165. Accordingly, hard water from the inlet port 170 flows downwardly through the bore 46 in the fitting 40 and out the distributor pipe 17 into the treatment tank 11.

The hard water flows through the bed 12 of resin and hardness inducing ions are removed therefrom. The treated water flows into the collector pipe 18 buried in the resin bed 12 and passes upwardly into the valve arrangement 15 through the bore 66 in the sleeve 60.

With the valve assembly 125 in its "up" position, the valve disk 135 is seated in sealing relationship against the annular valve seat 84. At the same time, the valve pin 126, at its lower section 133, seals the aperture 136 in the valve disk 135. Accordingly, the treated water is forced to exit the chamber 78 through the outlet port 190 to the service line 19.

Normal service continues in the aforedescribed manner until the aforementioned timing device 20 manipulates the conventional cam arrangement (not shown) to cyclically operate the valve assemblies 100, 120, 125, 145 and 230, and effect regeneration of the resin bed 12 in the treatment tank 11. In a six-cycle water conditioning system, the aforementioned valve assemblies are cyclically operated to initiate and control pre-brining backwash, brining, slow rinse, post-brining backwash, and fast rinse of the resin bed 12.

Referring now to FIG. 3, when the timing device 20 calls for regeneration at any prescribed time on a selected day or days of the week, the aforementioned cam arrangement is first effective to simultaneously move the inlet valve assembly 145 to its "intermediate" position and the drain valve assembly 100 to its "down" position. With the inlet valve assembly 145 in its "intermediate"position, the valve disk 165 seats in sealing relationship on the annular valve seat 41 while the pin section 163 seals the aperture 166 through the disk. Water from the inlet port 170 is directed upwardly through the chamber section 71 and the horizontal passage 75 into the outlet chamber 78. At this point, a portion of the untreated water leaves the valve arrangement 15 through the outlet port 190 to the service line 19 and provides a continuous supply of water in the household, for example, during regeneration.

At the same time, a portion of the water entering the outlet chamber 78 is directed downwardly through the bore 66 in the sleeve 65 to the collector pipe 18 where it passes into the bed 12 of resin and upwardly through the bed, washing impurities and accumulated foreign material out of the bed, in a "-backwash" flow of water. This backwash water laden with foreign material passes upwardly through the distributor pipe Regardless of the system employed, whether it be three or more cycles, the valve assemblies 125 and 145 are especially effective to assure that no trace of brine is permitted to enter the service line 19 before, during, or after the regeneration period. This assurance is provided by the manner in which the valve assemblies 125 and 145 move to their "down" positions after the brining and slow rinse cycles to permit water to open the apertures 136 and 166 in the discs 135 and 166, respectively. An immediate downflow of water past the valve seats 61 and 41 is achieved in the post-brining backwash and fast rinse cycles of the various systems without lifting the valve discs 135 and 165 off their respective valve seats 61 and 41. If these discs were lifted off their respective valve seats 61 and 41 rather than the valve pins 126 and 146 being moved downwardly to open up the apertures 136 and 166, the slight pressure drop at the valve seats could cause any residual brine to flow upwardly under the valve discs to the outlet port 190 and into the service line 19, thus contaminating the service water during regeneration.

The valve assembly 125 and its respective valve seats 61, 84, 81, 137 provides maximum operational flexibility with a minimum of components in a single valve unit. Use of the valve assembly 125 and its slightly less versatile neighbor 145 makes a simple yet sophisticated valve arrangement 15.

Another feature of the valve arrangement 15 is that it infallibly shuts off water flow to the nozzle and venturi lines 22 and 23 to prevent brine drum overflow if the brine float (not shown) malfunctions. Furthermore, the nozzle and venturi can be removed without shutting off service water.

While the embodiment described herein is at present considered to be preferred, it is understood that various modifications and improvements may be made therein.

I claim:
1. A valve arrangement for controlling multiple cycle water conditioning treatment, comprising:
 a. valve body means,
 b. said valve body means having an inlet chamber with a service water inlet port and an outlet chamber with an outlet port,
 c. first passage means adapted to connect said inlet chamber with a treatment tank distributor,
 d. second passage means adapted to connect said outlet chamber with a treatment tank collector,
 e. third passage means adapted to connect said outlet chamber to a source of brine,
 f. fourth passage means adapted to connect the source of brine to said inlet chamber,
 g. fifth passage means adapted to connect said inlet chamber with said outlet chamber,
 h. inlet valve means in said inlet chamber and outlet valve means in said outlet chamber,
 i. said inlet valve means including a first inlet chamber valve seat between said inlet chamber and said first and fourth passage means,
 j. a second inlet chamber valve seat between said inlet chamber and said fifth passage means,
 k. said inlet valve means including an inlet valve assembly movable in said inlet chamber between an "up" position, an "intermediate" position, and a "down" position,
 l. said inlet valve assembly including a first inlet valve member adapted to seat against said second inlet chamber valve seat when said assembly is in its "up" position and against said first inlet chamber valve seat when said assembly is in its "intermediate" position,
 m. aperture means in said first inlet valve member for permitting liquid flow therethrough,
 n. and a second inlet valve member movable in said aperture means to open said inlet valve member aperture means when said assembly is in its "down" position,
 o. said outlet valve means including a first outlet chamber valve seat between said outlet chamber and said second passage means,
 p. a second outlet chamber valve seat between said outlet chamber and said third passage means,
 q. said outlet valve means comprising an outlet valve assembly movable in said outlet chamber between an "up" position, an "intermediate" position and a "down" position,
 r. said outlet valve assembly including a first outlet valve member adapted to seat against said second outlet chamber valve seat when said assembly is in its up position and against said first outlet chamber valve seat when said outlet valve assembly is in its intermediate position,
 s. aperture means in said first outlet valve member for permitting liquid flow therethrough,
 t. and a second outlet valve member movable in said second aperture means to open said outlet valve member aperture means when outlet valve assembly is in its "down" position,
 u. said outlet valve means further including a third outlet chamber valve seat between said outlet chamber and said third passage means,
 v. said second outlet valve member being movable to seat against said third outlet chamber valve seat when said valve assembly is in its "down" position.

2. The valve arrangement of claim 1 further characterized in that:
 a. said first valve members comprise valve discs having aperture means formed therethrough and defining aperture seats,
 b. said second valve members comprising valve pins extending through corresponding aperture means and having reduced diameter sections disposed in corresponding aperture means when corresponding valve assemblies are in their down positions and removed from corresponding aperture means when corresponding valve assemblies are in their intermediate and up positions.

3. The valve arrangement of claim 2 further characterized in that:
 a. the valve pin in said outlet valve assembly has an enlarged section engagable with said third valve seat when said outlet valve assembly is in its "up" position.

4. The valve arrangement of claim 1 further characterized by and including:
 a. sixth passage means connecting said inlet chamber with drain means,
 b. seventh passage means connecting said outlet chamber with drain means,
 c. and drain valve means in each of said sixth and seventh passage means.

5. The valve arrangement of claim 4 further characterized by and including:
 a. shut-off valve means for controlling the flow of liquid through said fourth passage means.

6. The valve arrangement of claim 5 further characterized in that:
 a. said shut-off valve means is normally biased into a closed position to shut off communication through said fourth passage means between said inlet chamber and the source of brine.